US012398581B2

(12) United States Patent
Liao

(10) Patent No.: US 12,398,581 B2
(45) Date of Patent: Aug. 26, 2025

(54) ELECTRIC LOCK WITH ELECTRIC AND MANUAL UNLOCK MODE

(71) Applicant: Yi-Fan Liao, Taoyuan (TW)

(72) Inventor: Yi-Fan Liao, Taoyuan (TW)

( * ) Notice: Subject to any disclaimer, the term of this patent is extended or adjusted under 35 U.S.C. 154(b) by 94 days.

(21) Appl. No.: 18/528,046

(22) Filed: Dec. 4, 2023

(65) Prior Publication Data

US 2024/0102318 A1 Mar. 28, 2024

Related U.S. Application Data

(63) Continuation-in-part of application No. 17/804,325, filed on May 27, 2022, now abandoned.

(30) Foreign Application Priority Data

Jun. 1, 2021 (TW) ................................ 110206328

(51) Int. Cl.
*E05B 47/00* (2006.01)
*E05B 63/08* (2006.01)

(52) U.S. Cl.
CPC .. *E05B 47/0001* (2013.01); *E05B 2047/0016* (2013.01); *E05B 2047/0035* (2013.01); *E05B 2047/0037* (2013.01); *E05B 2047/0084* (2013.01); *E05B 63/08* (2013.01)

(58) Field of Classification Search
CPC ................. E05B 47/0001; E05B 63/08; E05B 2047/0016; E05B 2047/0035; E05B 2047/0037; E05B 2047/0084
See application file for complete search history.

(56) References Cited

U.S. PATENT DOCUMENTS 2,693,591 A * 11/1954 Morse ..................... E05B 17/22 70/432
3,792,888 A * 2/1974 Kambic .............. E05B 47/0607 292/144
4,429,556 A * 2/1984 Kambic .................. E05B 57/00 70/472
4,557,121 A * 12/1985 Charlton ............. E05B 47/0002 70/279.1
4,643,006 A * 2/1987 Bron ..................... E05B 65/104 292/181
2016/0258189 A1* 9/2016 Frolov .................... E05B 63/08
2016/0273243 A1* 9/2016 Geringer ............. E05B 47/0005
2019/0383060 A1* 12/2019 Lien .................... E05B 47/0692

(Continued)

*Primary Examiner* — Mark A Williams

(74) *Attorney, Agent, or Firm* — Birch, Stewart, Kolasch & Birch, LLP

(57) ABSTRACT

An electric lock with electric and manual unlock mode, comprising: a case combining with a side plate and a case cover; a latch bolt, a latch bolt shaft and a latch bolt spring, the front end of the latch bolt shaft is combined with a blocking member, and the blocking member uses the elastic force of the latch bolt spring to stick out of the side plate to lock, when the external force applied to the latch bolt shaft is sufficient to resist the elastic force of the latch bolt spring, the blocking member will retract into the side plate to unlock; a unlock crank, having an electric push member and a manual push member, and a push member relative to the latch bolt shaft; and a linear actuator and an actuating arm, the outer end of the actuating arm is combined with a push block relative to the electric push member, and a push block return spring is set relative to the push block.

4 Claims, 6 Drawing Sheets

(56) References Cited

U.S. PATENT DOCUMENTS

| | | | | |
|---|---|---|---|---|
| 2020/0123808 | A1* | 4/2020 | Lovejoy | E05B 15/0046 |
| 2020/0270918 | A1* | 8/2020 | Bogdanov | E05B 47/0673 |
| 2021/0054655 | A1* | 2/2021 | Cheng | E05B 63/08 |
| 2021/0062544 | A1* | 3/2021 | Lien | E05B 63/08 |
| 2022/0356730 | A1* | 11/2022 | Leites | E05B 47/0692 |

* cited by examiner

ELECTRIC LOCK WITH ELECTRIC AND MANUAL UNLOCK MODE

This patent application is a continuation-in-part of Ser. No. 17/804,325 filed on May, 27, 2022.

BACKGROUND OF THE INVENTION

1. Field of the Invention

The invention relates to an electric lock with electric and manual unlock mode, especially the one that uses a same unlock crank to push the latch bolt shaft to unlock.

2. Description of the Related Art

U.S. Patent No. US20160273243A1 disclosed an electric lock with electric and manual unlock mode, it uses a motor to drive the clevis moving through a threaded lead screw for driving a second retraction lever to rotate, and by the rotation of the second retraction lever, it can against the biasing force that latch bolt spring applied to the latch bolt, so as to retract the latch bolt to unlock; moreover, when the user wants to restore the latch bolt to the locked state, stop the power supply to the motor, use the spring installed on the screw to reset the clevis, and use the latch bolt spring to reset the latch bolt; Furthermore, a key can also be used to rotate a key cylinder to drive a bolt lever to rotate, and then through the rotation of the bolt lever, the biasing force exerted by the latch bolt spring on the latch bolt can be resisted, make the latch bolt be retracted to unlock, and when the key is reset, the latch bolt is simultaneously reset by the latch bolt spring.

However, the prior art above mentioned can use a motor to unlock the lock electrically or manually with a key, and the motor uses the second retraction lever to retract the latch bolt to unlock, and the key uses the bolt lever to retract the lock bolt to unlock, so that the prior art above mentioned must be simultaneously installed with the second retraction lever and the bolt lever, the assembly procedure and the number of components are relatively complicated. In addition, the spring installed on the screw to reset the clevis should be a compression spring to resist the self-locking force of the motor. Since the restoring force of the compression spring must be adjusted through the combination of the diameter and length of the spring, the restoring force of the compression spring is difficult to adjust to an appropriate value. When the restoring force of the compression spring for resetting the clevis is too large, the resistance of the motor during electric unlocking will be too large, and the time required to complete the electric unlocking will be prolonged (even the lock cannot be unlocked). On the contrary, if the restoring force of the compression spring for resetting the clevis is too small, the restoring force of the latch bolt spring must be used to resist the self-locking force of the motor, so that the bolt may not be able to return to the locked state normally; Therefore, if the spring is only a linear compression spring, because the longer the distance of the compression spring is when the elastic force is released, the elastic force will decrease significantly, so there is a problem that the spring restoring force against the self-locking force of the motor will be difficult to adjust.

U.S. Pat. No. 5,953,942 disclosed a door lock comprises a driver hub connected to a door lever, a driven hub, a latch lever movable by the driven hub for retracting the lock's bolt to open the lock, and a catch mechanism for selectively connecting the driver hub to the driven hub. The catch mechanism includes an idle position in which the driver hub moves without moving the driven hub and an engaged position in which the driver hub moves the driven hub and thus the lever and the bolt. A state selection mechanism is provided to displace the catch mechanism between its idle and engaged positions. An actuating mechanism, e.g. a solenoid, selectively positions the state selection mechanism such that the latter causes the catch mechanism, when driven by the driver hub, to adopt one of its idle and engaged positions such that the catch mechanism respectively drives, or not, the driven hub. The actuating mechanism thus allows the state selection mechanism to mechanically cause the catch mechanism to selectively connect or disconnect the driver hub from the driven hub and thus to respectively unlock or maintain locked the door lock. The actuating mechanism typically allows the state selection mechanism to position the catch mechanism in its engaged position, i.e. in its door unlocking position, when activated by a current which results from a valid entry having been recorded in an electronic access control system, or the like. However, this patent is using the actuator mechanism to achieve access control effect, and it has to keep energized to achieve unlocking from outside.

SUMMARY OF THE INVENTION

It is a primary objective of the present invention to solve the problems of the prior art that the assembly process and the number of components are relatively complex, and has the effect of simplifying the assembly process and the number of components.

It is another objective of the present invention to has the effect of using a torsion spring to make it easier to adjust the spring restoring force that resists the self-locking force of the motor.

In order to achieve the above objectives, the present invention comprise: a case combining with a side plate and a case cover; a latch bolt, a latch bolt shaft and a latch bolt spring are arranged inside the case, the front end of the latch bolt shaft is combined with a blocking member, and the blocking member uses the elastic force of the latch bolt spring to stick out of the side plate to lock, when the external force applied to the latch bolt shaft is sufficient to resist the elastic force of the latch bolt spring, the blocking member will retract into the side plate to unlock; a unlock crank pivoted inside the case, having an electric push member, and a push member relative to the latch bolt shaft; and a linear actuator is arranged inside the case and has an actuating arm, the front end of the actuating arm is combined with a push block relative to the electric push member, and a push block return spring is set relative to the push block.

Also, the unlock crank further include a manual push member, a lock cylinder arranged inside the case, and an actuating cam wheel relative to the manual push member.

Also, the push block return spring is a torsion spring, the torsion spring is set on the case or the case cover by using a first shoulder bolt, the first rotating arm of the torsion spring is positioned on the case or the case cover, the outer end of a second rotating arm of the torsion spring is against the front edge of the push block; wherein the first rotating arm of the torsion spring is positioned on the case or the case cover by a second shoulder bolt or a positioning hole. The linear actuator is a linear stepping motor. The latch bolt shaft and the latch bolt spring are set inside the case by using a latch bolt bracket.

Whereby, whether the push block is pushed forward by the actuating arm of the linear actuator, the unlock crank is pushed and rotated through the electric push member, and the latch bolt shaft is pushed by the push member, so that the blocking member is retracted into the side plate and the lock is electrically unlocked; Or use the key to insert the lock cylinder to rotate the actuating cam wheel, push the unlock crank through the manual push member, and the latch bolt shaft is pushed by the push member, so that the blocking member is retracted into the side plate and the lock is manually unlocked, both of two are all using the same the unlock crank pushes the latch bolt shaft to unlock.

DETAILED DESCRIPTION OF THE PREFERRED EMBODIMENT

Figure 1:
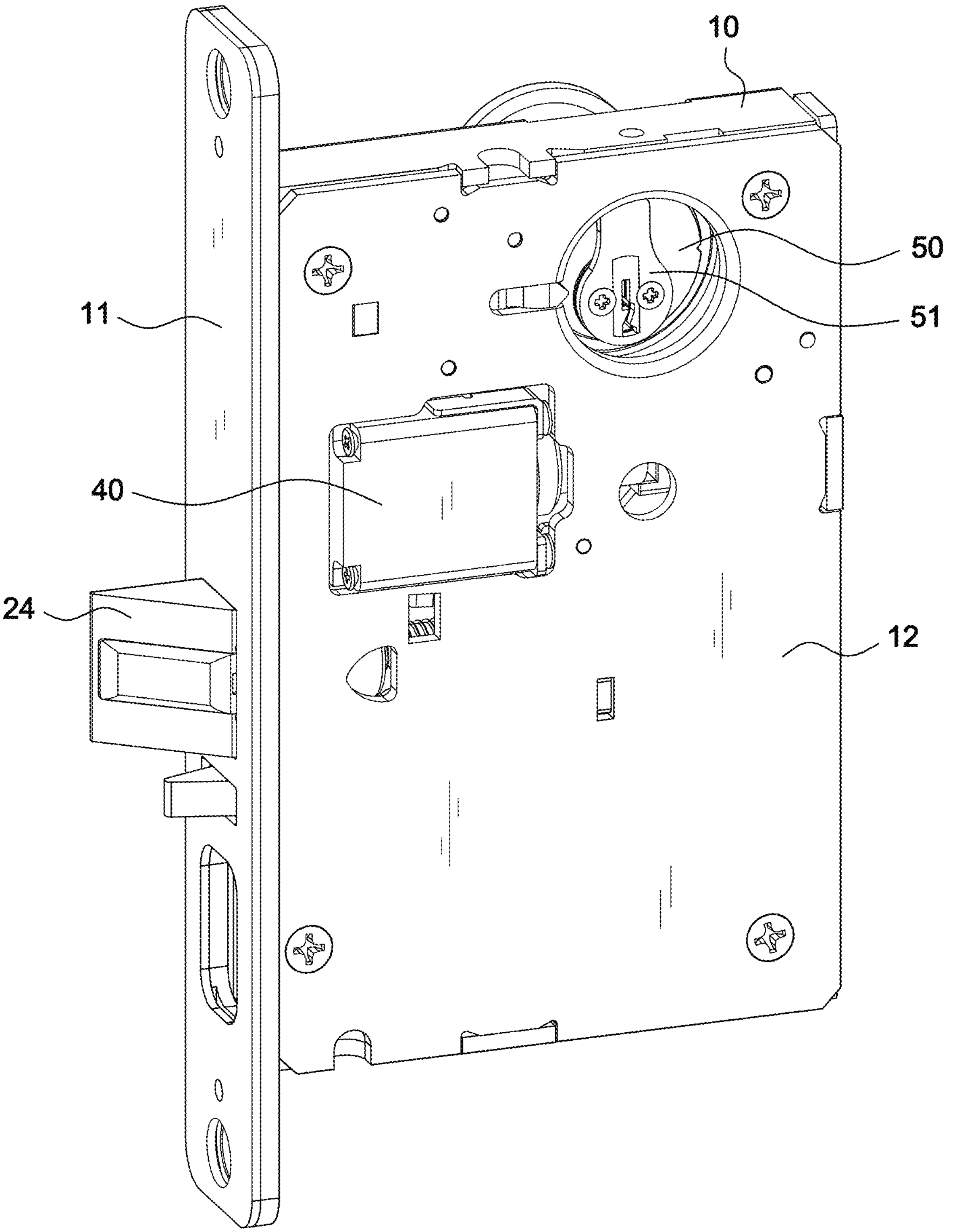
FIG. 1 is a perspective views of the structure of the present invention.
Figure 2:
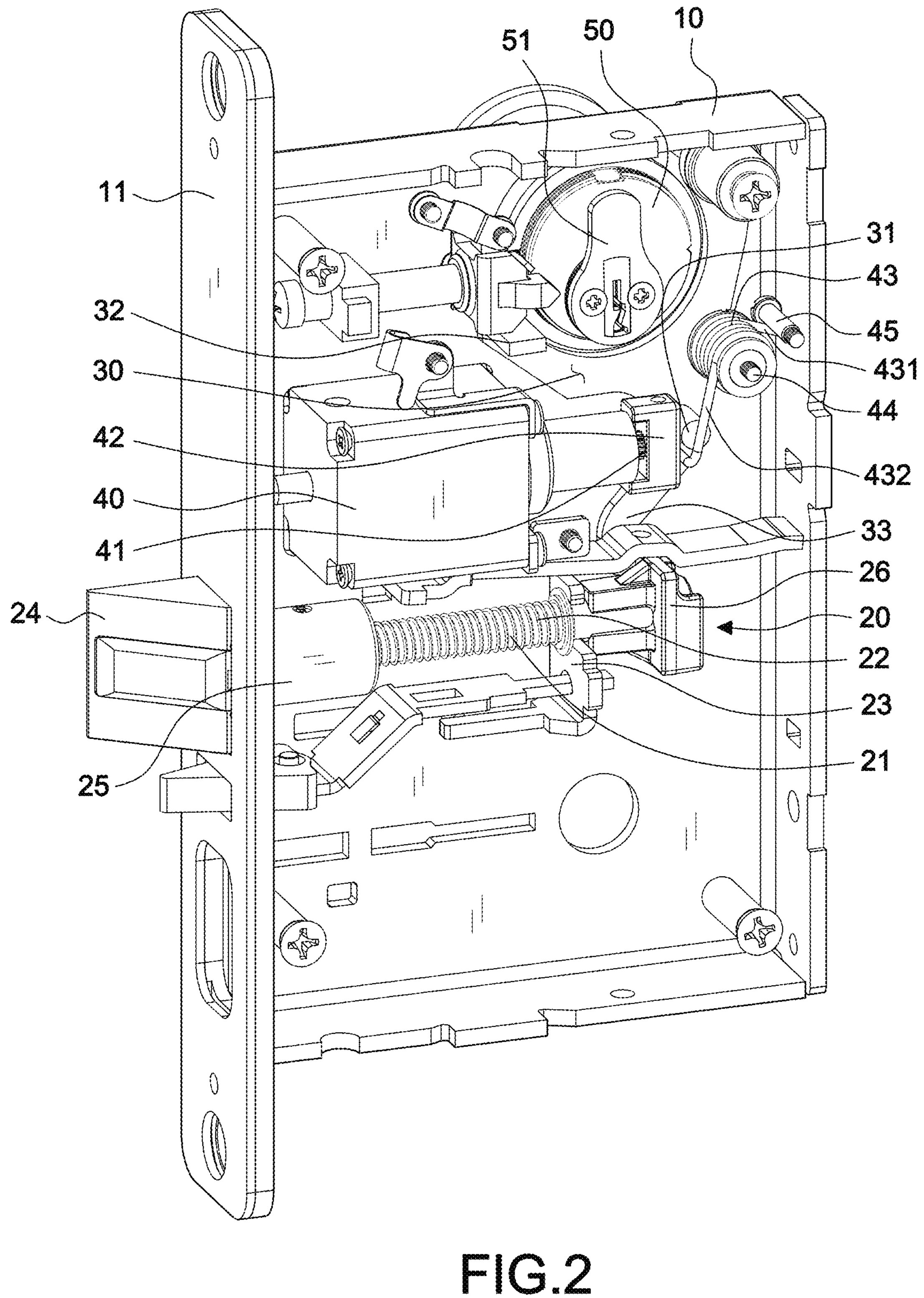
FIG. 2 is a perspective views of the main structure of the present invention.
Figure 3:
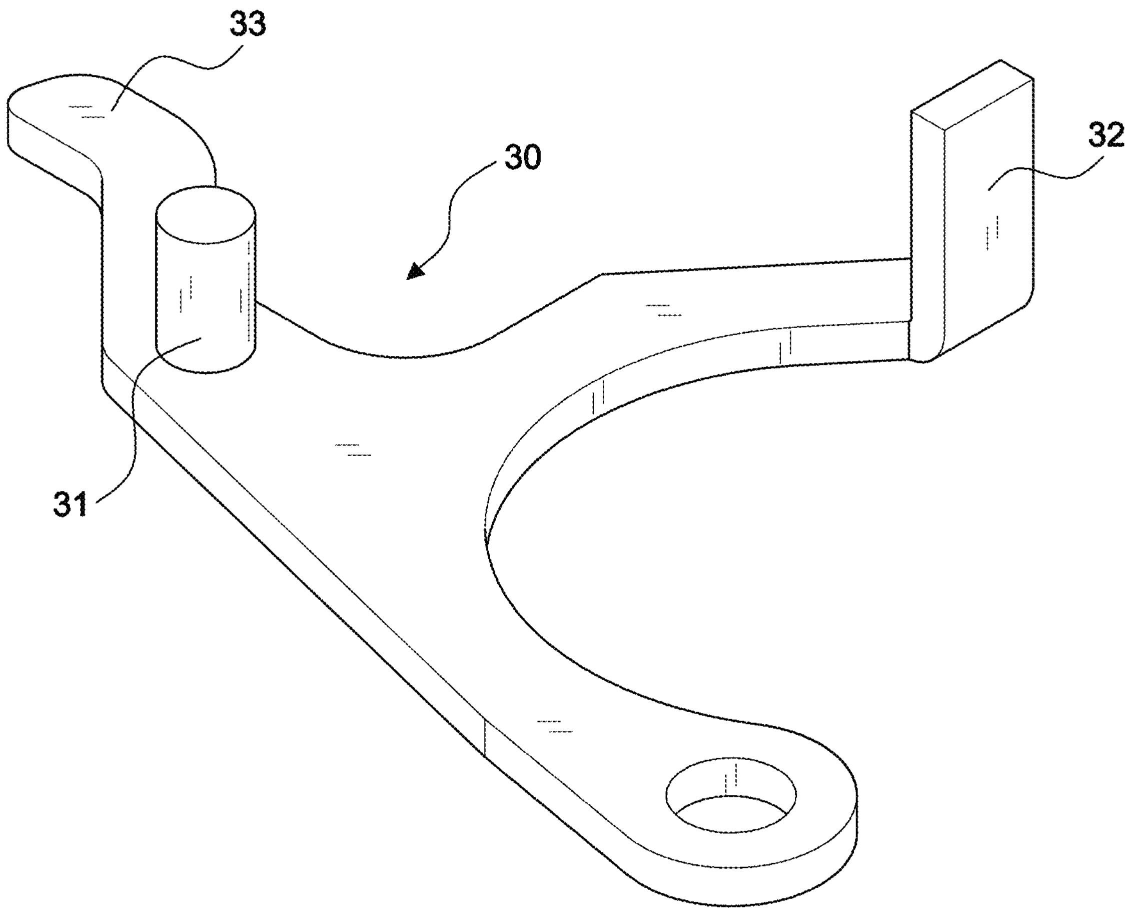
FIG. 3 is a perspective views of the unlock crank of the present invention.

Referring to FIGS. 1-3, the present invention includes: a case 10 combining with a side plate 11 and a case cover 12; a latch bolt 20, a latch bolt shaft 21 and a latch bolt spring 22 are arranged inside the case 10 by using a latch bolt bracket 23, the front end of the latch bolt shaft 21 has a combining member 25, and the rear end of the latch bolt shaft 21 having a controlling member 26, the combining member 25 is combined with a blocking member 24, the latch bolt spring 22 is sleeved on the latch bolt shaft 21 and arranged between the latch bolt bracket 23 and the combining member 25, and the blocking member 24 uses the elastic force of the latch bolt spring 22 to stick out of the side plate 11 to lock, when the external force applied to the latch bolt shaft 21 is sufficient to resist the elastic force of the latch bolt spring 22, the blocking member 24 will retract into the side plate 11 to unlock; a unlock crank 30 pivoted inside the case 10, having an electric push member 31 and a manual push member 32, and a push member 33 relative to the controlling member 26 of the latch bolt shaft 21; A linear actuator 40 is arranged inside the case 10 and has an actuating arm 41, the outer end of the actuating arm 41 is combined with a push block 42 relative to the electric push member 31, and torsion spring 43 is set as a push block return spring relative to the push block 42, the torsion spring 43 is set on the case 10 or the case cover 12 by using a first shoulder bolt 44, the first rotating arm 431 of the torsion spring 43 is positioned on the case 10 or the case cover 12 by a second shoulder bolt 45 or a positioning hole, the outer end of a second rotating arm 432 of the torsion spring 43 is against the front edge of the push block 42; in this embodiment, further includes a lock cylinder 50 arranged inside the case 10, and an actuating cam wheel 51 relative to the manual push member 32.

Figure 4:
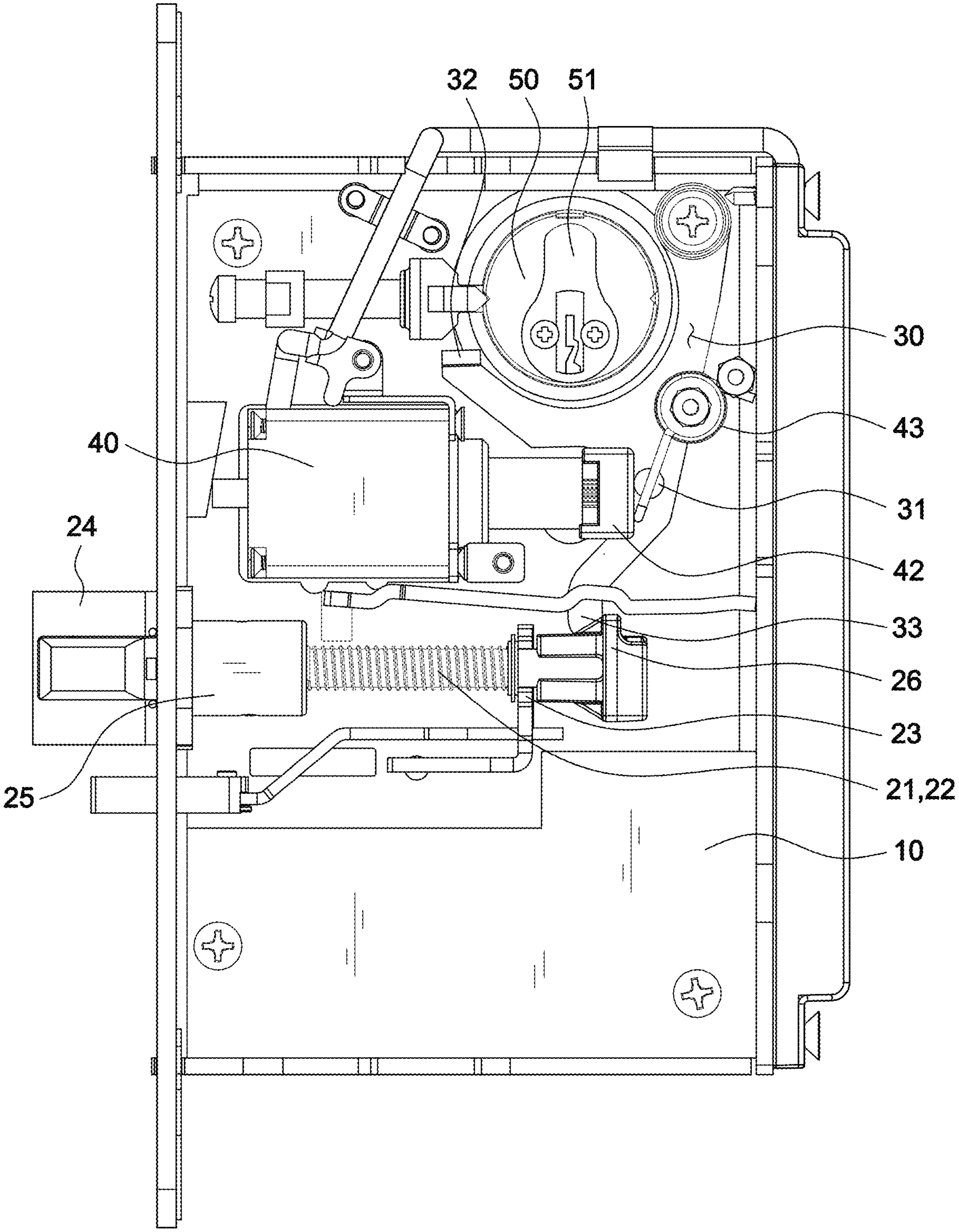
FIG. 4 is a schematic diagram illustrating locked state of the present invention.
Figure 5:
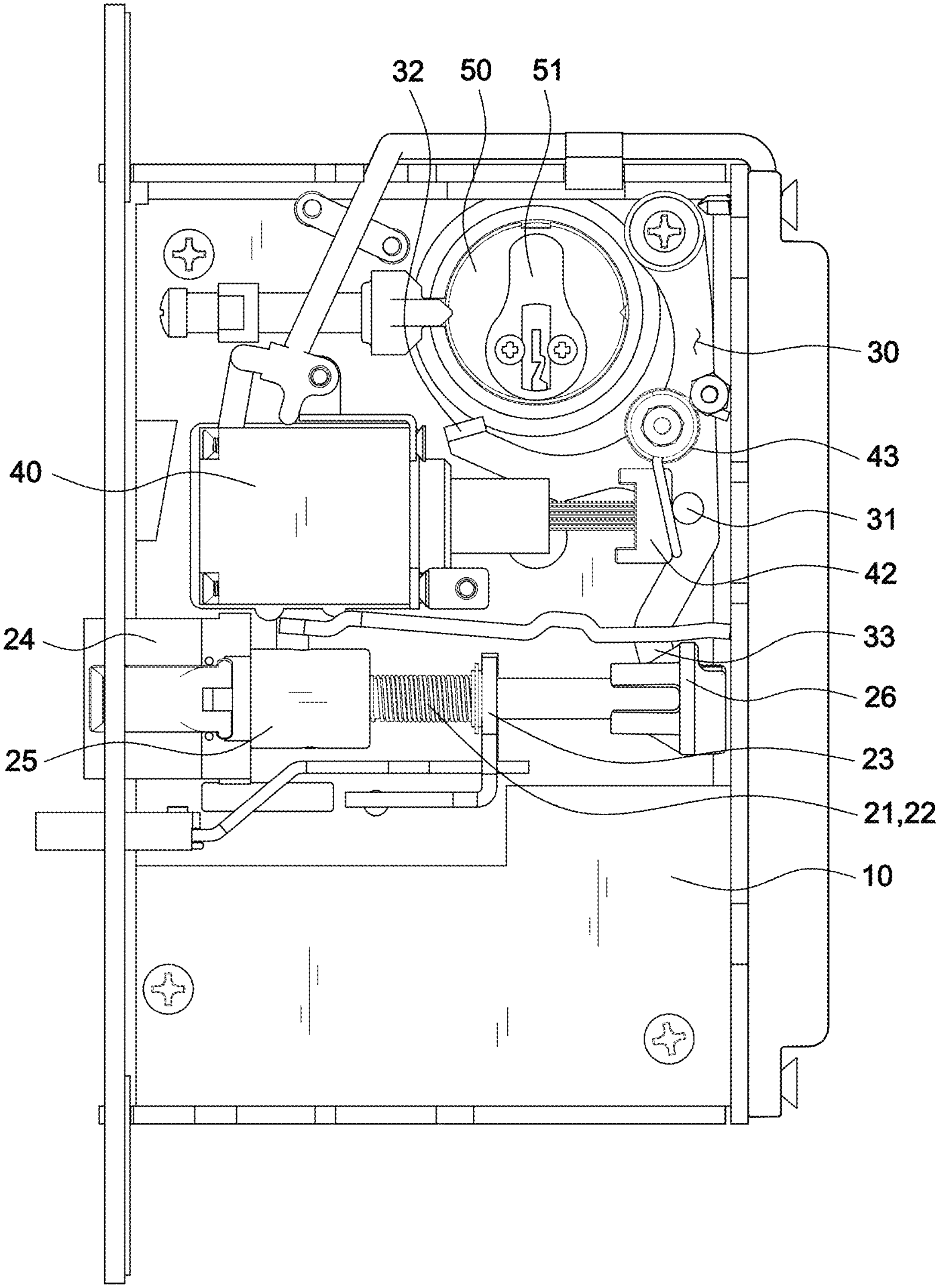
FIG. 5 is a schematic diagram illustrating electric unlocked state of the present invention.
Figure 6:
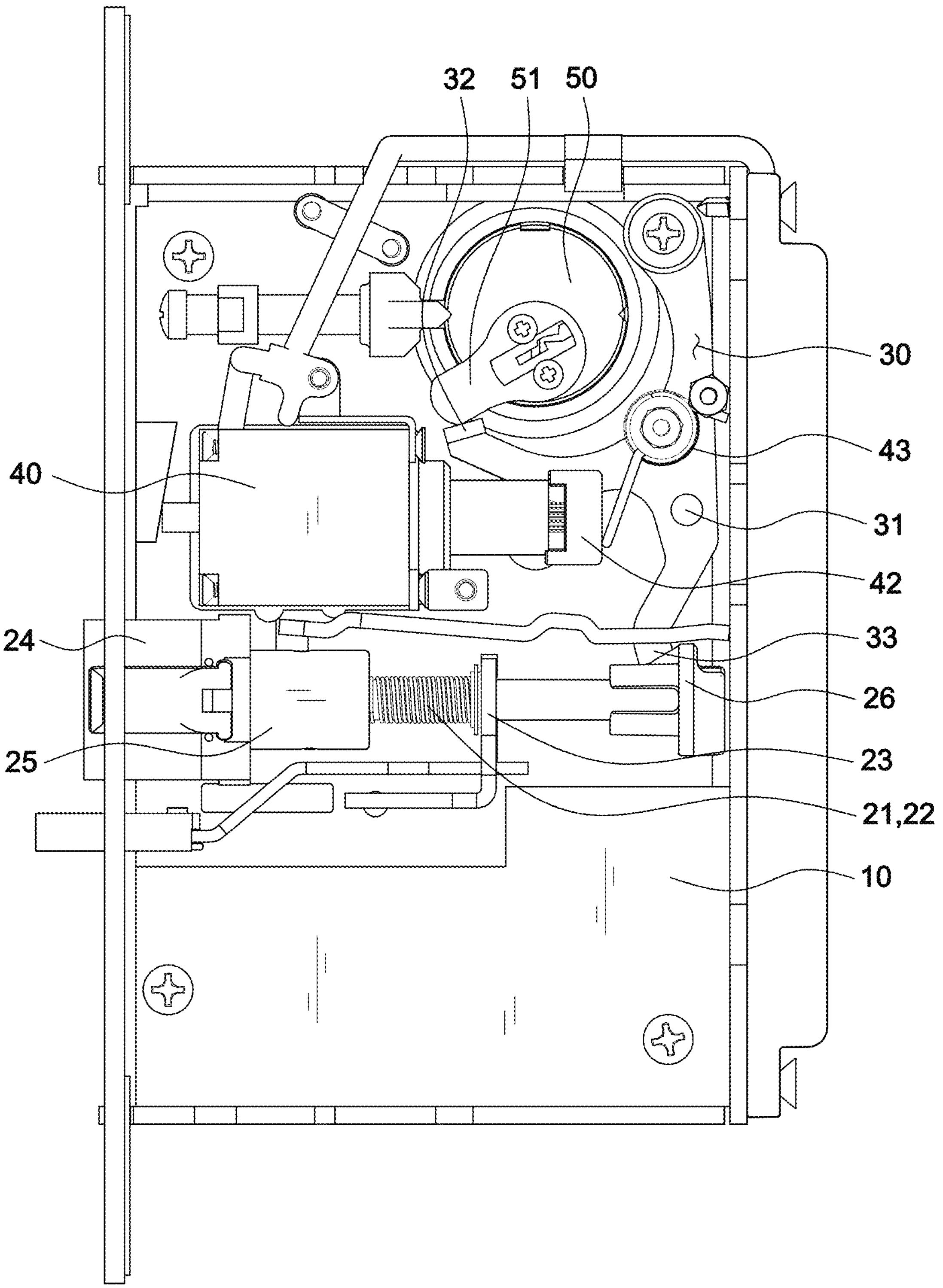
FIG. 6 is a schematic diagram illustrating manual unlocked state of the present invention.

With the feature disclosed above, as FIG. 4 showing, the blocking member 24 uses the elastic force of the latch bolt spring 22 to stick out of the side plate 11 to lock. While unlocking, as FIG. 5 showing, using the energized linear actuator 40 to cause the actuating arm 41 to extend outward, by the pushing of the push block 42 to push the electric push member 31 then further rotating the unlock crank 30, and using the push member 33 to push the controlling member 26 of the latch bolt shaft 21 to push the latch bolt shaft 21 toward the rear end, so as to make the blocking member 24 retract into the side plate 11 to unlock; When the linear actuator 40 is powered off, the push block 42 is reset by the torsion spring 43, the blocking member 24 and the unlock crank 30 are reset by the latch bolt spring 22, so as to restore to the locked state, as showing in FIG. 4. Alternatively, as showing in FIG. 6, use the key to insert the lock cylinder 50 to rotate the actuating cam wheel 51, push the unlock crank 30 through the manual push member 32 by the actuating cam wheel 51, and the push member 33 pushes the controlling member 26 of the latch bolt shaft 21 to push the latch bolt shaft 21 toward the rear end, so that the blocking member 24 is retracted into the side plate 11 and the lock is manually unlocked; The actuating cam wheel 51 is reset with the rotation of the key, the blocking member 24 and the unlock crank 30 are reset by the latch bolt spring 22, so as to restore to the locked state, as showing in FIG. 4. Therefore, the present invention is using the same unlock crank 30 to push the latch bolt shaft 21 to unlock during the electric unlocking or manual unlocking, which has the effect of simplifying the assembly procedure and the number of components. Therefore, the present invention is quite different in structure and achieving effect comparing with U.S. Pat. No. 5,953,942.

In addition, when the linear actuator 40 is powered off and returning to the locked state from the electric unlocking state, the torsion spring 43 set relatively to the push block 42 can provide a restoring elastic force against the self-locking force of the linear actuator 40 for rest the push block 42, the blocking member 24 uses the elastic force of the latch bolt spring 22 to stick out of the side plate 11 to lock; since the spring restoring force of the torsion spring 43 is easier to adjust to an appropriate value (compared to the linear compression spring), the present invention also has the effect of using the torsion spring to make the spring restoring force resisting the self-locking force of the motor easier to adjust.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric lock with electric and manual unlock modes, said electric lock comprising:

a case combining with a side plate and a case cover, the case configured for mounting on one of a door and door frame;

a latch bolt, a latch bolt shaft and a latch bolt spring are arranged inside the case by using a latch bolt bracket, a front end of the latch bolt shaft having a combining member, and a rear end of the latch bolt shaft having a controlling member, the combining member is combined with a blocking member for blocking the other of the door and door frame, the latch bolt spring is sleeved on the latch bolt shaft and arranged between the latch bolt bracket and the combining member, and the blocking member uses the compressing elastic force of the latch bolt spring to extend out of an opening in the side plate to form a lock state, when an external force applied to the latch bolt shaft is sufficient to resist the compressing elastic force of the latch bolt spring, the blocking member will retract into the side plate to form an unlock state;

a unlock crank pivoted inside the case, having an electric push member and a manual push member, and a push member relative to the controlling member of the latch bolt shaft; and a linear actuator is arranged inside the case and has an actuating arm, the front end of the actuating arm is combined with a push block relative to the electric push member, the linear actuator is energized to cause the actuating arm to extend outward, and the push block pushes the electric push member to push the unlocking crank, and the push member pushes the controlling member of the latch bolt shaft to pull toward the rear end, causing the blocking member to retract into the side plate to electrically unlock the lock; and a push block return spring is set relative to the push block, the linear actuator is powered off, the push block is restored by the push block return spring, the blocking member and the unlocking crank are restored by the push block return spring, and the push block return spring is extended out of the side plate and restored to form the locked state; and a lock cylinder arranged inside the case, and an actuating cam wheel relative to the manual push member, using the key to insert the lock cylinder to rotate the actuating cam wheel, push the unlock crank through the manual push member by the actuating cam wheel, and the push member pushes the controlling member of the latch bolt shaft to push the latch bolt shaft toward the rear end, so that the blocking member is retracted into the side plate and the lock is manually unlocked.

2. The electric lock with electric and manual unlock mode as claimed in claim 1, wherein the push block return spring is a torsion spring, the torsion spring is set on the case or the case cover by using a first shoulder bolt, the first rotating arm of the torsion spring is positioned on the case or the case cover, the outer end of a second rotating arm of the torsion spring is against the front edge of the push block.

3. The electric lock with electric and manual unlock mode as claimed in claim 2, wherein the first rotating arm of the torsion spring is positioned on the case or the case cover by a second shoulder bolt or a positioning hole.

4. The electric lock with electric and manual unlock mode as claimed in claim 1, wherein the linear actuator is a linear stepping motor.

* * * * *